Figure 1:
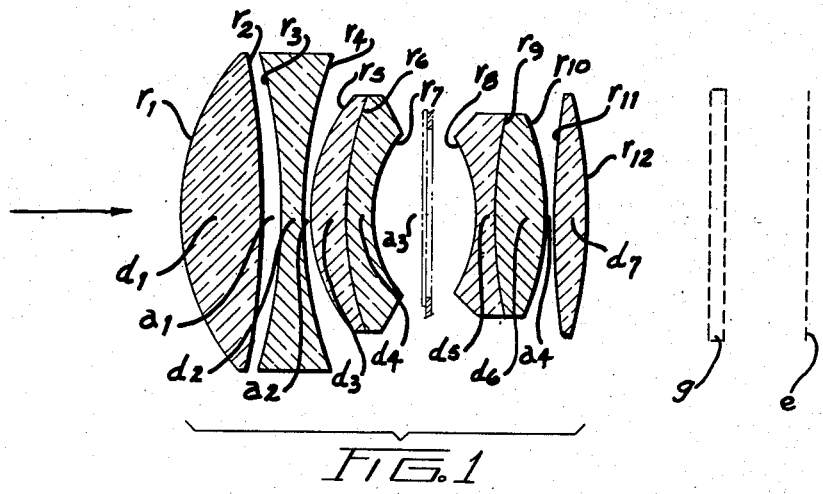

Dec. 23, 1952 G. KLEINEBERG ET AL 2,622,478
PHOTOGRAPHIC OBJECTIVE LENS SYSTEM
Filed July 20, 1950

INVENTORS
Gustav Kleineberg
BY Otto Zimmermann
Fred A. Klein
attorney

Patented Dec. 23, 1952

2,622,478

UNITED STATES PATENT OFFICE 2,622,478

PHOTOGRAPHIC OBJECTIVE LENS SYSTEM

Gustav Kleineberg and Otto Zimermann, Wetzlar, Germany, assignors to Ernst Leitz G. m. b. H., Wetzlar, Germany, a corporation of Germany Application July 20, 1950, Serial No. 174,814
In Germany January 9, 1950

5 Claims. (Cl. 88—57)

This invention relates to photographic lens systems, and more particularly to improvements in photographic objective lens systems using a modified Gauss lens comprising, in general, two menisci arranged at each side of a diaphragm and between two condensing lenses forming the outer components of the lens system. It has been found that objectives of the general type described exhibit spherical aberrations of oblique bundles detrimental to the quality of the image, and it has been proposed to diminish such errors by making the menisci relatively slightly curved. However, such an arrangement results in a deterioration of the Petzval condition so that a sufficiently flat anastigmatic field is not obtained.

It is an object of the present invention to provide a high quality photographic objective.

It is a further object of this invention to provide an improved photographic objective eliminating aberrations to a high degree.

It is also an object of the invention to protect the sensitive photographic film or plate against radiation emanating from radio-active material in the condensing lenses.

The above and other objects are accomplished according to the present invention by reducing the Petzval sum for an objective lens system of the modified Gauss type to a minimum by making all condensing lenses of the system of glass types having a refractive index exceeding 1.65 and the Abbé number exceeding 50, that is (N>1.65, and V>50). This has a favorable effect on the spherical aberration of obliquely incident beams, but for large angles the spherical aberration is still too large. To eliminate the residual error, it is further proposed by the present invention to separate the condensing and dispersing lenses, which constitute the condensing component on the object side, by an air gap. By suitably shaping the two lenses, this air gap forms a dispersing air lens having the shape of a positive meniscus, its concave side facing the object; the width of the air lens should not exceed 5% of the focal length of the objective assembly.

In accordance with another feature of this invention, the quality of the objective may be further improved and the simultaneous correction of the spherical aberration and of the coma made still more accurate by splitting the meniscal component at the object side of the aperture into two separate lenses, one condensing and one dispersing, the air lens therebetween having a dispersing effect.

Glass types with a refractive index exceeding 1.65 and a comparatively smaller dispersion, suitable for the condensing lenses of the present invention, usually contain thorium oxide. Hence, these glass types emit radioactive radiation which causes fogging of the photographic emulsion when exposed for longer periods of time. To protect the photographic emulsion from this radiation, it is advisable to insert a lead-containing glass in front thereof. In particular, the last lens in the objective close to the image may be made of flint glass so that the radioactive radiation emitted by the preceding lenses is to a large extent absorbed by the lead in the flint glass.

Figure 2:
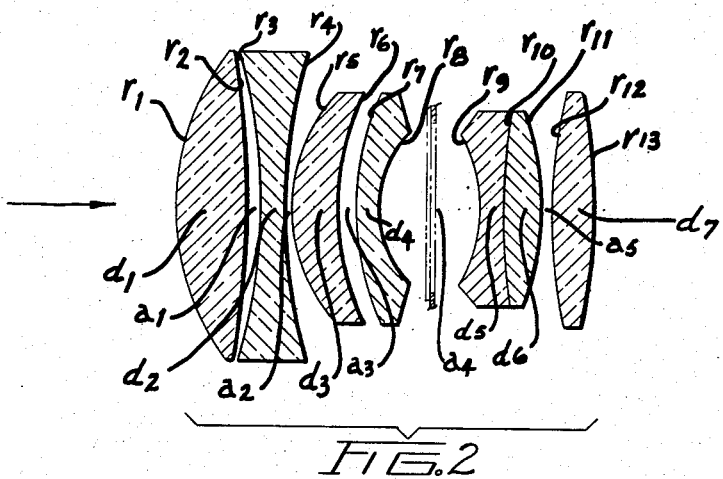

Further features and advantages of the present invention will become more apparent from the following description in conjunction with the drawings in which:

Fig. 1 is a cross-sectional view through an objective system according to one embodiment of the invention; and Fig. 2 is a cross-sectional view of an objective showing another embodiment of the invention.

In Fig. 1, $g$ shows a flint glass plate and $e$ a photographic emulsion.

The following two examples correspond to the embodiments illustrated in Figs. 1 and 2, respectively.

EXAMPLE 1

$f=100$, relative opening 1:2, angle subtended by image 50°

|  |  | $n_d$ | $v$ |
|---|---|---|---|
| $r_1 = +52.15$ | $d_1 = 14.5$ | 1.69112 | 54.8 |
| $r_2 = -305.2$ | | | |
| $r_3 = -267.54$ | $a_1 = 0.4$ | | |
| | $d_2 = 5.3$ | 1.65017 | 33.7 |
| $r_4 = +99.67$ | $a_2 = 0.2$ | | |
| $r_5 = +37.18$ | $d_3 = 6.6$ | 1.69112 | 54.8 |
| $r_6 = +68.86$ | $d_4 = 4.4$ | 1.54814 | 45.9 |
| $r_7 = +24.09$ | $a_3 = 18.9$ | | |
| $r_8 = -32.36$ | $d_5 = 3.6$ | 1.58217 | 38.0 |
| $r_9 = +119.76$ | $d_6 = 9.3$ | 1.69112 | 54.8 |
| $r_{10} = -51.45$ | $a_4 = 2.0$ | | |
| $r_{11} = +275.26$ | $d_7 = 6.0$ | 1.69112 | 54.8 |
| $r_{12} = -95.62$ | | | |

Seidel's coefficients

| area | A | B | Γ | P | Δ |
|---|---|---|---|---|---|
| 1 | +1.7039 | +0.8886 | +0.4634 | +0.7837 | +0.6503 |
| 2 | +3.1074 | −1.6295 | +0.8545 | +0.1339 | −0.5183 |
| 3 | −3.1627 | +1.6147 | −0.8244 | −0.1473 | +0.4961 |
| 4 | +0.0014 | +0.0216 | +0.3445 | −0.3953 | −0.8094 |
| 5 | +0.0849 | +0.0810 | +0.0772 | +1.0992 | +1.1214 |
| 6 | +0.0164 | −0.0415 | +0.1053 | −0.0793 | −0.0659 |
| 7 | −1.0088 | −0.9287 | −0.8549 | −1.4698 | −2.1401 |
| 8 | −2.4738 | −0.0243 | −0.0002 | −1.1371 | −0.0112 |
| 9 | +0.0317 | +0.0723 | +0.1649 | +0.0340 | +0.4538 |
| 10 | +0.8767 | −0.0537 | +0.0033 | +0.7943 | −0.0488 |
| 11 | −0.0071 | +0.0458 | −0.2954 | +0.1485 | +0.9475 |
| 12 | +1.1525 | +0.0466 | +0.0019 | +0.4275 | +0.0174 |
| Sum | +0.3225 | +0.0929 | +0.0401 | +0.1923 | +0.0928 |

EXAMPLE 2

$f=100$, relative opening 1:2, angle subtended by image 50°

|  |  | $n_d$ | $\nu$ |
|---|---|---|---|
| $r_1=+\ 53.84$ | | | |
| | $d_1=13.25$ | 1.6923 | 54.7 |
| $r_2=-382.69$ | | | |
| | $a_1=\ 0.54$ | | |
| $r_3=-328.33$ | | | |
| | $d_2=\ 3.92$ | 1.65017 | 33.7 |
| $r_4=+110.12$ | | | |
| | $a_2=\ 0.2$ | | |
| $r_5=+\ 34.36$ | | | |
| | $d_3=\ 6.67$ | 1.6923 | 54.7 |
| $r_6=+\ 56.75$ | | | |
| | $a_3=\ 0.39$ | | |
| $r_7=+\ 59.27$ | | | |
| | $d_4=\ 4.51$ | 1.57501 | 41.3 |
| $r_8=+\ 23.69$ | | | |
| | $a_4=20.02$ | | |
| $r_9=-\ 34.28$ | | | |
| | $d_5=\ 3.63$ | 1.58217 | 38.0 |
| $r_{10}=+115.3$ | | | |
| | $d_6=\ 8.78$ | 1.6923 | 54.7 |
| $r_{11}=-\ 54.16$ | | | |
| | $a_5=\ 1.96$ | | |
| $r_{12}=+268.86$ | | | |
| | $d_7=\ 6.08$ | 1.71715 | 47.9 |
| $r_{13}=-106.21$ | | | |

*Seidel's coefficients*

| area | A | B | Γ | P | Δ |
|---|---|---|---|---|---|
| 1 | +1.5489 | +0.8339 | +0.4490 | +0.7598 | +0.6508 |
| 2 | +2.5478 | −1.4610 | +0.8378 | +0.1069 | −0.5417 |
| 3 | −2.5886 | +1.4453 | −0.8070 | −0.1200 | +0.5176 |
| 4 | +0.0001 | +0.0055 | +0.3455 | −0.3578 | −0.7668 |
| 5 | +0.2807 | +0.2235 | +0.1780 | +1.1906 | +1.0899 |
| 6 | +0.0269 | −0.1516 | +0.8556 | −0.7209 | −0.7598 |
| 7 | −0.0414 | +0.1792 | −0.7760 | +0.6160 | +0.6927 |
| 8 | −1.0817 | −0.9567 | −0.8462 | −1.5411 | −2.1116 |
| 9 | −2.2092 | +0.0356 | −0.0006 | −1.0735 | +0.0173 |
| 10 | +0.0255 | +0.0612 | +0.1470 | +0.0357 | +0.4389 |
| 11 | +0.8048 | −0.0868 | +0.0094 | +0.7553 | −0.0824 |
| 12 | −0.0099 | +0.0564 | −0.3210 | +0.1553 | +0.9424 |
| 13 | +1.0131 | −0.0257 | +0.0006 | +0.3932 | −0.0100 |
| sum | +0.3170 | +0.1588 | +0.0721 | +0.1995 | +0.0773 |

Throughout the specification, examples and claims, various symbols are used to indicate the following:

$r$=radius of lens surface
$d$=thickness of lens
$a$=distance of two lenses at their crest
$f$=focal length
$n_d$=refractive index for the $d$-line
$\nu$ for Abbé's number
Seidel—coefficients:
A for spherical aberration
B for coma
Γ for astigmatism
P for curvature of image
Δ for distortion It is to be clearly understood that, while the invention has been described and illustrated in connection with specific embodiments thereof, various modifications and variations within the spirit and scope thereof may occur to those skilled in the art. We intend to be limited, therefore, only by the claims appended to this specification and forming a part thereof.

What is claimed is:

1. A photographic objective lens system comprising two meniscal components arranged between two positive components, at least three of said components consisting of a positive and a negative element, wherein the separate positive components as well as the positive elements cemented to respective negative elements are of glass having a refractive index exceeding 1.65 and the Abbé number exceeding 50, that is (N>1.65, V>50), an air gap in the form of a positive meniscus between the two elements forming the positive component on the object side of the system, said air gap having its concave side directed toward the object and having an axial thickness not exceeding 5% of the focal length of the objective.

2. A photographic objective lens system as defined in claim 1, wherein the meniscal component at the object side of the system consists of a positive and a negative element, and a dispersing air lens is provided therebetween.

3. A photographic objective as defined in claim 1, comprising lead containing light-transparent glass means absorbing radio-active rays positioned between the last lens of the objective and the photographic emulsion.

4. A photographic objective as defined in claim 3 wherein said light-transparent absorbing means is a plate of flint glass.

5. A photographic objective lens system comprising two meniscal components arranged between two positive components, at least three of said components consisting of a positive and a negative lens element, the first three positive elements being of glass having a refractive index exceeding 1.65 and an Abbé number exceeding 50, that is N>1.65, V>50, an air gap in the form of a positive meniscus between the two elements forming the positive component on the object side of the system, said air gap having its concave side directed toward the object and having an axial thickness not exceeding 5% of the focal length of the objective, a dispersing air gap between the elements of the meniscal component on the object side of the system, the last of said positive components on the image side being a flint glass lens absorbing radioactive rays.

GUSTAV KLEINEBERG.
OTTO ZIMERMANN.

REFERENCES CITED

The following references are of record in the file of this patent:

UNITED STATES PATENTS

| Number | Name | Date |
|---|---|---|
| 2,106,077 | Tronnier | Jan. 18, 1938 |
| 2,171,641 | Berek | Sept. 5, 1938 |
| 2,319,171 | Warmisham | May 11, 1943 |
| 2,378,328 | Robinson et al. | June 12, 1945 |
| 2,416,032 | Warmisham et al. | Feb. 18, 1947 |

FOREIGN PATENTS

| Number | Country | Date |
|---|---|---|
| 427,008 | Great Britain | Apr. 12, 1935 |
| 792,770 | France | Oct. 28, 1935 |
| 665,520 | Germany | Sept. 27, 1938 |